United States Defensive Publication [19] (H) [11] T104,901

Cox et al. [43] Dec. 4, 1984

[54] DESTRUCTION OF ORGANIC HAZARDOUS WASTE BY PARTIAL OXIDATION/GASIFICATION

[76] Inventors: Doye B. Cox, 514 Lancaster Cir.; Hugh T. Carson, 5712 N. Morgan La., both of Chattanooga, Tenn. 37415

[21] Appl. No.: 562,788

[22] Filed: Dec. 19, 1983

[51] Int. Cl.[3] ..... F23G 7/04

[52] U.S. Cl. ..... 110/346; 110/238; 110/347

[57] ABSTRACT

Process for the thermal destruction of hazardous organic wastes utilizing high temperatures (2200° F.-3000° F.), long retention times (1.5-4 seconds), and high pressures (300+psi) in a reactor having a controlled partial oxidation environment to thermally break the bonds of organic molecules into CO, $CO_2$, $H_2$, and acid gases (such as $H_2S$, HCN, HCL). In the preferred embodiment, pulverized coal, organic waste matter, and slurry water are pumped into the reactor vessel. The coal and waste matter are both broken into simple gases and the slurry water is split into hydrogen and oxygen. Downstream processing equipment removes particulates, acid gases, and $CO_2$ making a product gas suitable for use as a fuel or chemical feedstock.

The process has distinct advantages over existing thermal hazardous waste destruction processes including, but not limited to, (1) energy and materials conservative, (2) fewer process control parameters, (3) can operate independent of waste availability, (4) limited exposure to the environment of any byproducts, (5) ability to recycle any incomplete destruction products, (6) most metals entering the system are fixated in a silicate slag, and (7) can handle waste not suitable to conventional incineration. This timely invention can help solve both the energy problem and problems with hazardous waste disposal.

7 Claims, 1 Sheet Drawing,

24 Pages Specification

The file of this unexamined application may be inspected and copies thereof may be purchased (849 O.G. 1221, Apr. 9, 1968).

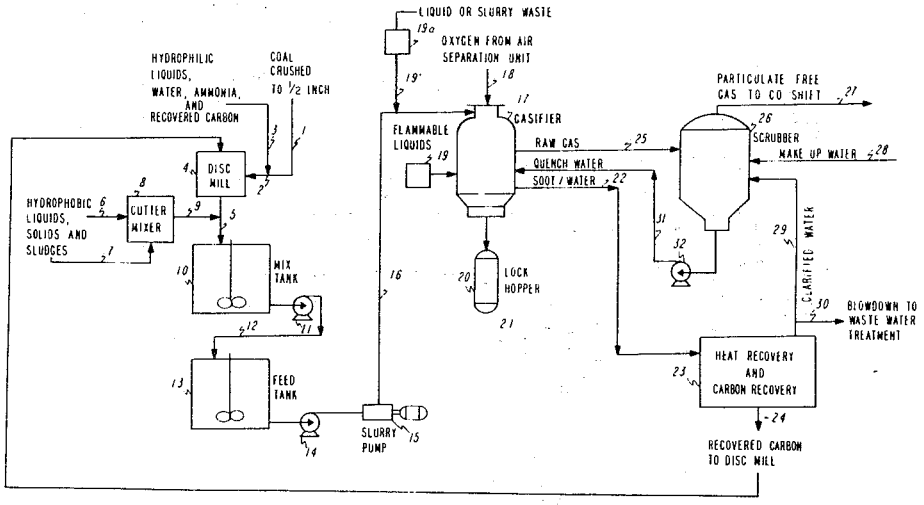

COAL FEED PREPARATION AND GASIFICATION

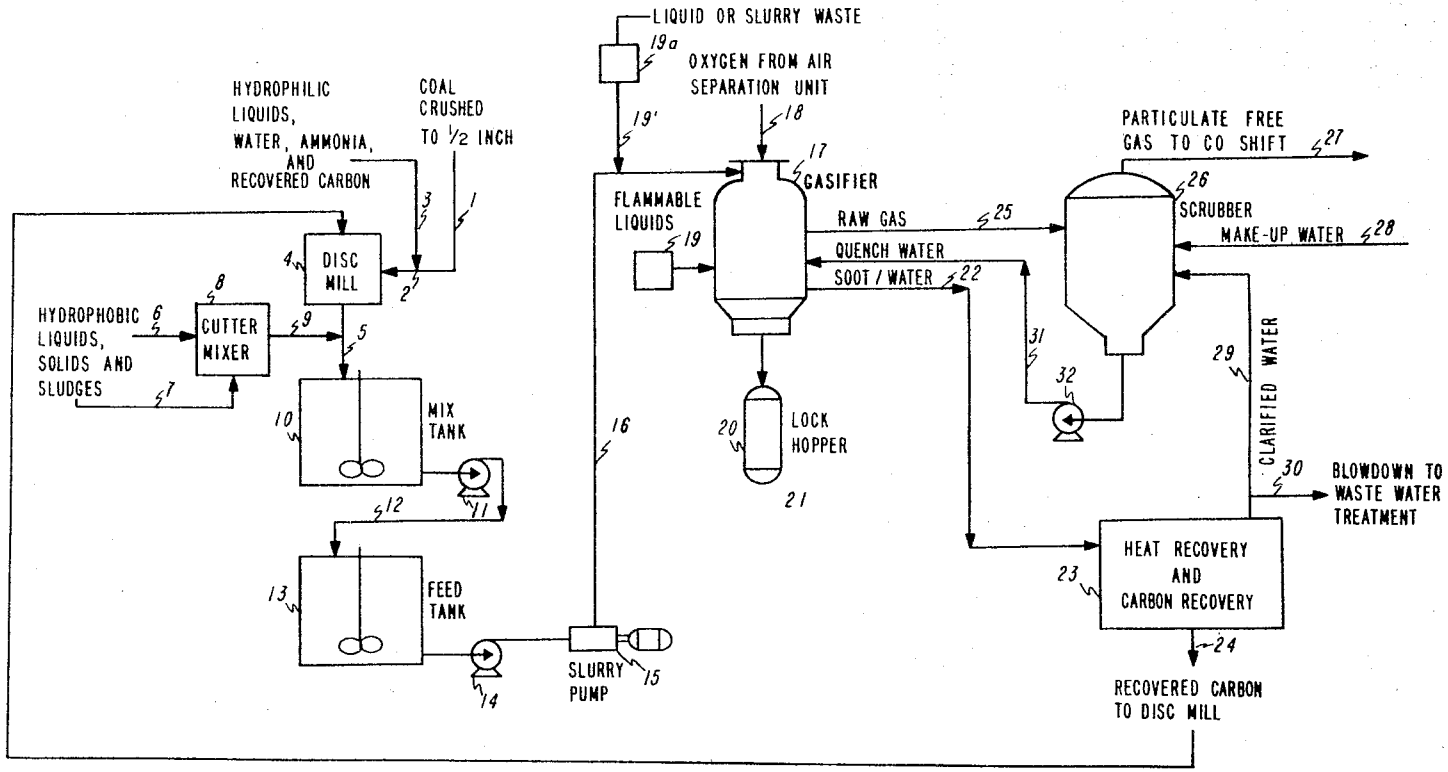
COAL FEED PREPARATION AND GASIFICATION